US010397270B2

(12) United States Patent
Wolfe (10) Patent No.: US 10,397,270 B2
(45) Date of Patent: Aug. 27, 2019

(54) DYNAMIC SESSION RATE LIMITER

(71) Applicant: A10 Networks, Inc., San Jose, CA (US)

(72) Inventor: Kurt Wolfe, San Diego, CA (US)

(73) Assignee: A10 Networks, Inc., San Jose, CA (US)

( * ) Notice: Subject to any disclaimer, the term of this patent is extended or adjusted under 35 U.S.C. 154(b) by 199 days.

(21) Appl. No.: 15/398,623

(22) Filed: Jan. 4, 2017

(65) Prior Publication Data

US 2018/0191772 A1  Jul. 5, 2018

(51) Int. Cl.
*G06F 21/00* (2013.01)
*H04L 29/06* (2006.01)
*H04L 29/08* (2006.01)

(52) U.S. Cl.
CPC ...... *H04L 63/1458* (2013.01); *H04L 63/1466* (2013.01); *H04L 67/14* (2013.01); *H04L 67/12* (2013.01); *H04L 2463/142* (2013.01)

(58) Field of Classification Search
CPC ............. H04L 63/1458; H04L 63/1416; H04L 29/12132; H04L 41/5029; H04L 41/509
See application file for complete search history.

(56) References Cited

U.S. PATENT DOCUMENTS

| | | |
|---|---|---|
| 4,001,819 A | 1/1977 | Wise |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,684,875 A | 11/1997 | Ellenberger |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |
| 6,205,115 B1 | 3/2001 | Ikebe et al. |
| 6,237,036 B1 | 5/2001 | Ueno et al. |
| 6,304,975 B1 | 10/2001 | Shipley |

(Continued)

FOREIGN PATENT DOCUMENTS

| | | |
|---|---|---|
| CN | 1422468 A | 6/2003 |
| CN | 104106241 A | 10/2014 |

(Continued)

OTHER PUBLICATIONS

Lee et al (NPL: On the Detection of Signaling DoS attack on 3G Wireless Networks: 2007 IEEE, pp. 1289-1297) (Year: 2007).*

(Continued)

*Primary Examiner* — Ghazal B Shehni
(74) *Attorney, Agent, or Firm* — Keith Kline; The Kline Law Firm PC (57) ABSTRACT

Provided are methods and systems for dynamically limiting new sessions. A method for dynamically limiting new sessions may commence with initiating a dynamic session rate limiter based on predetermined criteria. The method may further include dynamically ascertaining, by the dynamic session rate limiter, a remaining session table capacity. The method may continue with dynamically limiting, by the dynamic session rate limiter, a number of new sessions according to a function selected to negatively correlate the new sessions and the remaining session table capacity.

20 Claims, 7 Drawing Sheets

(56) References Cited

U.S. PATENT DOCUMENTS

| | | |
|---|---|---|
| 6,324,286 B1 | 11/2001 | Lai et al. |
| 6,449,651 B1 | 9/2002 | Dorfman et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,159,237 B2 | 1/2007 | Schneier et al. |
| 7,194,766 B2 | 3/2007 | Noehring et al. |
| 7,222,366 B2 | 5/2007 | Bruton, III et al. |
| 7,296,283 B2 | 11/2007 | Hrastar et al. |
| 7,392,241 B2 | 6/2008 | Lin et al. |
| 7,418,733 B2 | 8/2008 | Connary et al. |
| 7,543,052 B1 | 6/2009 | Cesa Klein |
| 7,565,549 B2 | 7/2009 | Satterlee et al. |
| 7,577,833 B2 | 8/2009 | Lai |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,736 B1 | 6/2010 | Tripathi et al. |
| 7,809,131 B1 | 10/2010 | Njemanze et al. |
| 7,895,649 B1 | 2/2011 | Brook et al. |
| 8,037,532 B2 | 10/2011 | Haswell |
| 8,220,056 B2 | 7/2012 | Owens, Jr. |
| 8,239,670 B1 | 8/2012 | Kaufman et al. |
| 8,289,981 B1 | 10/2012 | Wei et al. |
| 8,301,802 B2 | 10/2012 | Wei et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,800,034 B2 | 8/2014 | McHugh et al. |
| 8,806,011 B1 | 8/2014 | Graham-Cumming |
| 8,813,228 B2 | 8/2014 | Magee et al. |
| 8,832,832 B1 | 9/2014 | Visbal |
| 9,215,208 B2 | 12/2015 | Fraize et al. |
| 9,621,575 B1 | 4/2017 | Jalan et al. |
| 2001/0042204 A1 | 11/2001 | Blaker et al. |
| 2002/0087708 A1 | 7/2002 | Low et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0135625 A1 | 7/2003 | Fontes et al. |
| 2003/0187688 A1 | 10/2003 | Fey et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0242200 A1 | 12/2004 | Maeoka et al. |
| 2005/0021999 A1 | 1/2005 | Touitou et al. |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0108434 A1 | 5/2005 | Witchey |
| 2005/0210243 A1 | 9/2005 | Archard et al. |
| 2005/0257093 A1 | 11/2005 | Johnson et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0206936 A1 | 9/2006 | Liang et al. |
| 2006/0212522 A1 | 9/2006 | Walter et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0073660 A1 | 3/2007 | Quinlan |
| 2007/0291773 A1 | 12/2007 | Khan et al. |
| 2008/0183885 A1 | 7/2008 | Durrey et al. |
| 2008/0229418 A1 | 9/2008 | Chen et al. |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0150996 A1 | 6/2009 | Haswell |
| 2009/0168995 A1 | 7/2009 | Banga et al. |
| 2009/0227228 A1 | 9/2009 | Hu et al. |
| 2009/0241190 A1 | 9/2009 | Todd et al. |
| 2009/0287941 A1 | 11/2009 | Shouno |
| 2010/0106833 A1 | 4/2010 | Banerjee et al. |
| 2010/0284300 A1 | 11/2010 | Deshpande et al. |
| 2010/0286998 A1 | 11/2010 | Picken |
| 2011/0026537 A1 | 2/2011 | Kolhi et al. |
| 2011/0029599 A1 | 2/2011 | Pulleyn et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0153744 A1 | 6/2011 | Brown |
| 2011/0249572 A1 | 10/2011 | Singhal et al. |
| 2012/0036272 A1 | 2/2012 | El Zur |
| 2012/0042060 A1 | 2/2012 | Jackowski et al. |
| 2012/0110472 A1 | 5/2012 | Amrhein et al. |
| 2012/0117646 A1 | 5/2012 | Yoon et al. |
| 2012/0163186 A1 | 6/2012 | Wei et al. |
| 2012/0174196 A1 | 7/2012 | Bhogavilli et al. |
| 2012/0216282 A1* | 8/2012 | Pappu ................ H04L 63/1416 726/23 |
| 2012/0226582 A1 | 9/2012 | Hammad |
| 2012/0307631 A1 | 12/2012 | Yang et al. |
| 2013/0019025 A1 | 1/2013 | Chaturvedi et al. |
| 2013/0124713 A1 | 5/2013 | Feinberg et al. |
| 2013/0128885 A1 | 5/2013 | Kardashov et al. |
| 2013/0139245 A1 | 5/2013 | Thomas |
| 2013/0173795 A1 | 7/2013 | McPherson |
| 2013/0198385 A1 | 8/2013 | Han et al. |
| 2013/0212265 A1 | 8/2013 | Rubio Vidales et al. |
| 2014/0006508 A1 | 1/2014 | Goyet et al. |
| 2014/0025568 A1 | 1/2014 | Smith et al. |
| 2014/0137190 A1 | 5/2014 | Carey et al. |
| 2014/0195630 A1* | 7/2014 | Malik .................... G06F 13/28 709/212 |
| 2014/0258489 A1 | 9/2014 | Muppala et al. |
| 2014/0258536 A1 | 9/2014 | Chiong |
| 2014/0269308 A1 | 9/2014 | Oshiba |
| 2014/0280832 A1 | 9/2014 | Oshiba |
| 2014/0283065 A1 | 9/2014 | Teddy et al. |
| 2014/0298091 A1 | 10/2014 | Carlen et al. |
| 2014/0310396 A1 | 10/2014 | Christodorescu et al. |
| 2014/0325588 A1 | 10/2014 | Jalan et al. |
| 2015/0026800 A1* | 1/2015 | Jain .................... H04L 63/1458 726/22 |
| 2015/0033341 A1 | 1/2015 | Schmidtler et al. |
| 2015/0088597 A1 | 3/2015 | Doherty et al. |
| 2015/0312268 A1 | 10/2015 | Ray |
| 2015/0333988 A1 | 11/2015 | Jalan et al. |
| 2017/0085440 A1 | 3/2017 | Dosovitsky |

FOREIGN PATENT DOCUMENTS

| | | |
|---|---|---|
| HK | 1198848 A | 6/2015 |
| TW | 375721 | 12/1999 |
| TW | 477140 B | 2/2002 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1988 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |

(56) References Cited

FOREIGN PATENT DOCUMENTS

OTHER PUBLICATIONS

"How to Create a Rule in Outlook 2003" CreateaRule—Outlook2003. doc 031405 mad, 3 pages.

"Oracle Intelligent Agent User's Guide," Oracle Corporation, Release 9.2.0, Part No. A96676-01, Mar. 2002, 36 pages.

"SOL11243: iRules containing the RULE_INIT iRule event do not re-initialize when a syntax error is corrected," F5 Networks, Inc., f5support.com, May 24, 2010, 1 page.

Ganesan et al., "Yappers: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Dainotti, Albert et al., "TIE: A Community-Oriented Traffic Classification Platform," May 11th, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

\* cited by examiner

| Established Sessions, x | Ln(x) | Dynamic Session Rate Limit Multiplier [(1/ln(x))/10] | Session Table Capacity | Static Session Rate Limit | Intermediate Calculation of Session Rate Limit | New Session Rate Limit | New Session Rate Limit with Predetermined Threshold |
|---|---|---|---|---|---|---|---|
| 2 | 0.69 | 0.14 | 10000000 | 500000 | 1442695 | 500000 | 500000 |
| 10 | 2.30 | 0.04 | 10000000 | 500000 | 434294 | 434294 | 434294 |
| 100 | 4.61 | 0.02 | 10000000 | 500000 | 217147 | 217147 | 217147 |
| 1000 | 6.91 | 0.01 | 10000000 | 500000 | 144765 | 144765 | 144765 |
| 10000 | 9.21 | 0.01 | 10000000 | 500000 | 108574 | 108574 | 108574 |
| 100000 | 11.51 | 0.01 | 10000000 | 500000 | 86859 | 86859 | 86859 |
| 1000000 | 13.82 | 0.01 | 10000000 | 500000 | 72382 | 72382 | 0 |

DYNAMIC SESSION RATE LIMITER

TECHNICAL FIELD

This invention relates generally to data network and more particularly to dynamically limiting new sessions.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Network services responsible for establishing client-server sessions can be overwhelmed by a Denial-of-Service (DoS) attack, a distributed Denial-of-Service (DDoS) attack, or Internet-of-Things (IoT) botnet traffic in an attempt to make the services unable to function by, for example, depleting their storage capacity to maintain established session data. Some services can be responsible for connecting millions of users in, for example, a gaming environment. Typically, when a request for a new session arrives, a service responsible for supporting sessions needs to determine whether the request is legitimate. To make this determination, the system has to complete a three-way transmission control protocol (TCP) handshake procedure to establish the session. Only after the session is established, can the system analyze the request in order to determine whether the request is legitimate. If the service is flooded with DDoS attack or IoT botnet traffic, the service can lack sufficient resources to establish and analyze the legitimacy of every session. Therefore, conventional DDoS and IoT botnet attack mitigation techniques have serious shortcomings.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for dynamically limiting new sessions. According to one approach of the present disclosure, a system for dynamically limiting new sessions is provided. Specifically, the system may include a processor, a dynamic session rate limiter, and a storage node. The processor may be configured to initiate a dynamic session rate limiter based on predetermined criteria. The dynamic session rate limiter may be configured to dynamically ascertain a remaining session table capacity. The dynamic session rate limiter may be further configured to dynamically limit a number of new sessions according to a function selected to negatively correlate the new sessions and the remaining session table capacity. The storage node may be configured to maintain a session table and store the remaining session table capacity associated with the session table.

According to another approach of the present disclosure, a method for dynamically limiting new sessions is provided. The method may commence with initiating, by a processor, a dynamic session rate limiter based on predetermined criteria. The method may further include dynamically ascertaining, by the dynamic session rate limiter, a remaining session table capacity. The method may continue with dynamically limiting, by the dynamic session rate limiter, a number of new sessions according to a function selected to negatively correlate the new sessions and the remaining session table capacity.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, and a laptop computer), a game console, a handheld gaming device, a cellular phone, a smart phone, a smart television system, and so forth.

As outlined in the summary, the embodiments of the present disclosure are directed to dynamically limiting new sessions. In a network environment, e.g., a gaming environment, where a plurality of users may be simultaneously engaged in a gaming process, a system for dynamically limiting new sessions may be directed to protecting existing sessions already established by the users. More specifically, the system may maintain a session table and store data associated with the established sessions in the session table. When a high connection rate occurs, such as initiated by an IoT bot attack or a DDoS attack, the task of the system may be to prevent the session table from being overrun with new sessions.

The system may include a dynamic session rate limiter, which may be initiated when capacity of the session table reaches a predetermined threshold. The remaining capacity of the session table can be defined as the remaining number of sessions that the session table can store. The dynamic session rate limiter may dynamically determine the remaining capacity of the session table and limit the number of new sessions according to a function selected to negatively correlate the new sessions and the remaining session capacity of the session table. Thus, as the remaining capacity of the session table decreases, the rate of the new sessions may also decrease according to the function. In some embodiments, the function is selected such that the new sessions are inversely proportional to the natural logarithm of the remaining capacity of the session table.

In some embodiments, the dynamic session rate limiter can set the rate of new sessions to zero when the ability of the sessions table to maintain new sessions falls below a predetermined threshold. When the capacity of the session table increases again, for example, due to deleting idle sessions from the session table, the dynamic session rate limiter may resume limiting new sessions according to the previously selected function.

Figure 1:
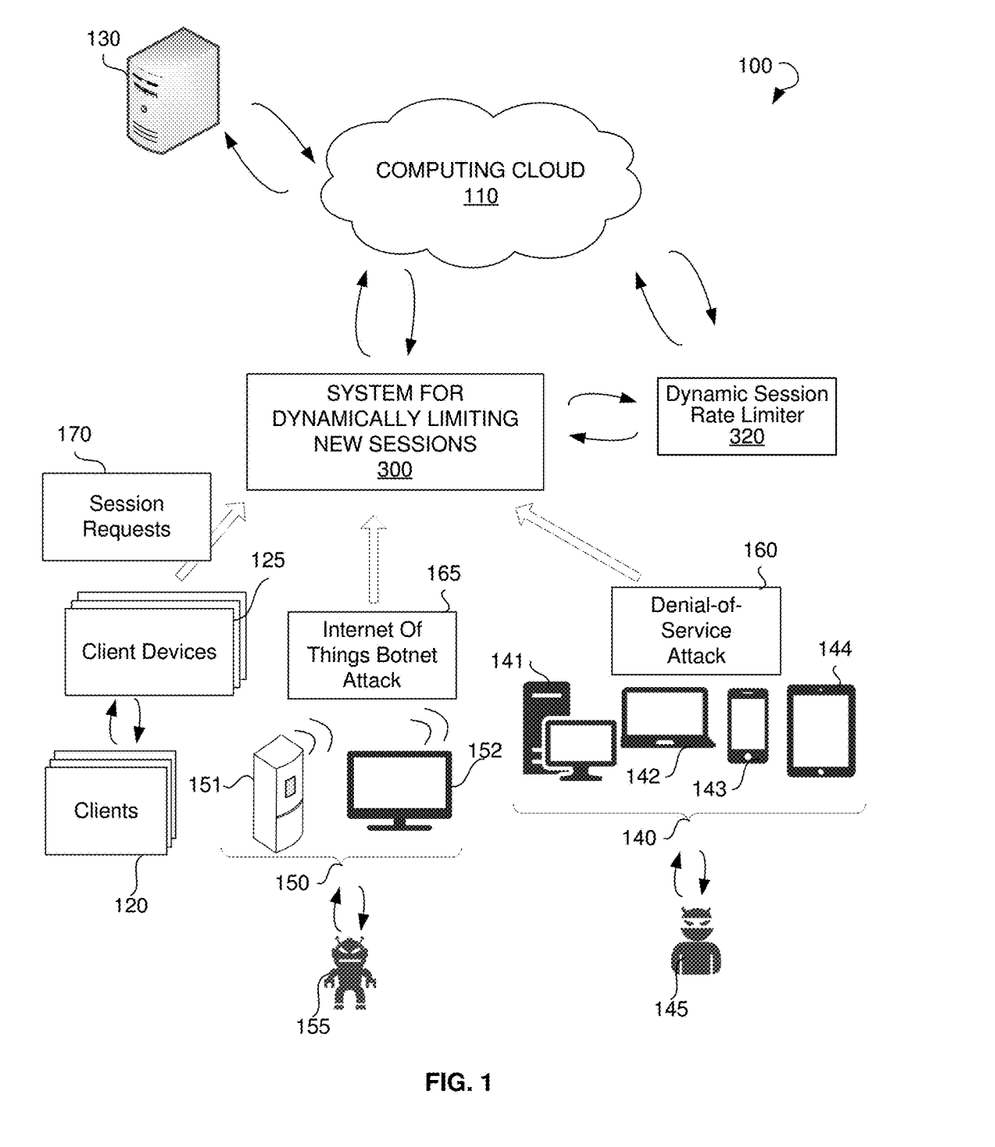
FIG. 1 shows an environment, within which methods and systems for dynamically limiting new sessions can be implemented.

Referring now to the drawings, FIG. 1 illustrates an environment 100 within which methods and systems for dynamically limiting new sessions can be implemented. The environment 100 may include a data network, such as a computing cloud 110, clients 120, client devices 125, a server 130, electronic devices 140, electronic devices 150, attackers 145 and 155, a system 300 for dynamically limiting new sessions (also referred to as a system 300), and a dynamic session rate limiter 320 associated with the system 300. The clients 120 may include users of network services (not shown) or network resources (not shown) associated with the server 130. The client devices 125 may include a personal computer (PC), a laptop, a smartphone, a mobile phone, a tablet PC, a television set, an Internet phone, a netbook, a home gateway, a broadband gateway, a network appliance, a set top box, a media server, a personal media player, an access gateway, a networking switch, a server computer, a network storage computer, and so forth. The clients 120 may make requests for establishing sessions with the server 130 by sending session requests 170. The clients 120, the server 130, and the system 300 may be connected to the computing cloud 110.

The electronic devices 140 may include PCs 141, laptops 142, mobile phones 143, tablet PCs 144 associated with a plurality of users and connected to the computing cloud 110. The electronic devices 140 may be compromised by the attacker 145 to perform a DoS attack 160 against the network services or the network resources associated with the server 130.

The electronic devices 150 may include IoT botnet devices that may have embedded electronics, software, and sensors and may be connected to computing cloud 110. The electronic devices 150 may include a refrigerator 151; a smart television set 152; other household appliances (not shown), such as microwaves, smart thermostats, and security cameras; other entertainment devices (not shown), such as gaming consoles; and any other devices that may be hacked by the attacker 155 to be used for performing an IoT botnet attack 165 against the network services or the network resources associated with the server 130.

The system 300 may monitor traffic directed to the server 130 using the dynamic session rate limiter 320. More specifically, the traffic may include the session requests 170 from the clients 120, session requests sent by the electronic devices 150 and constituting the IoT botnet attack 165, session requests sent by the electronic devices 140 and constituting the DoS attack 160, and any other requests associated with any other communications or attacks directed to the server 130. The session requests 170, the IoT botnet attack 165, the DoS attack 160, and any other communications or attacks may be directed to the server 130 simultaneously or not simultaneously.

The data network may not be limited to the computing cloud 110 but may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of an RS-232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes that are interconnected for the purpose of data communication.

Figure 2:
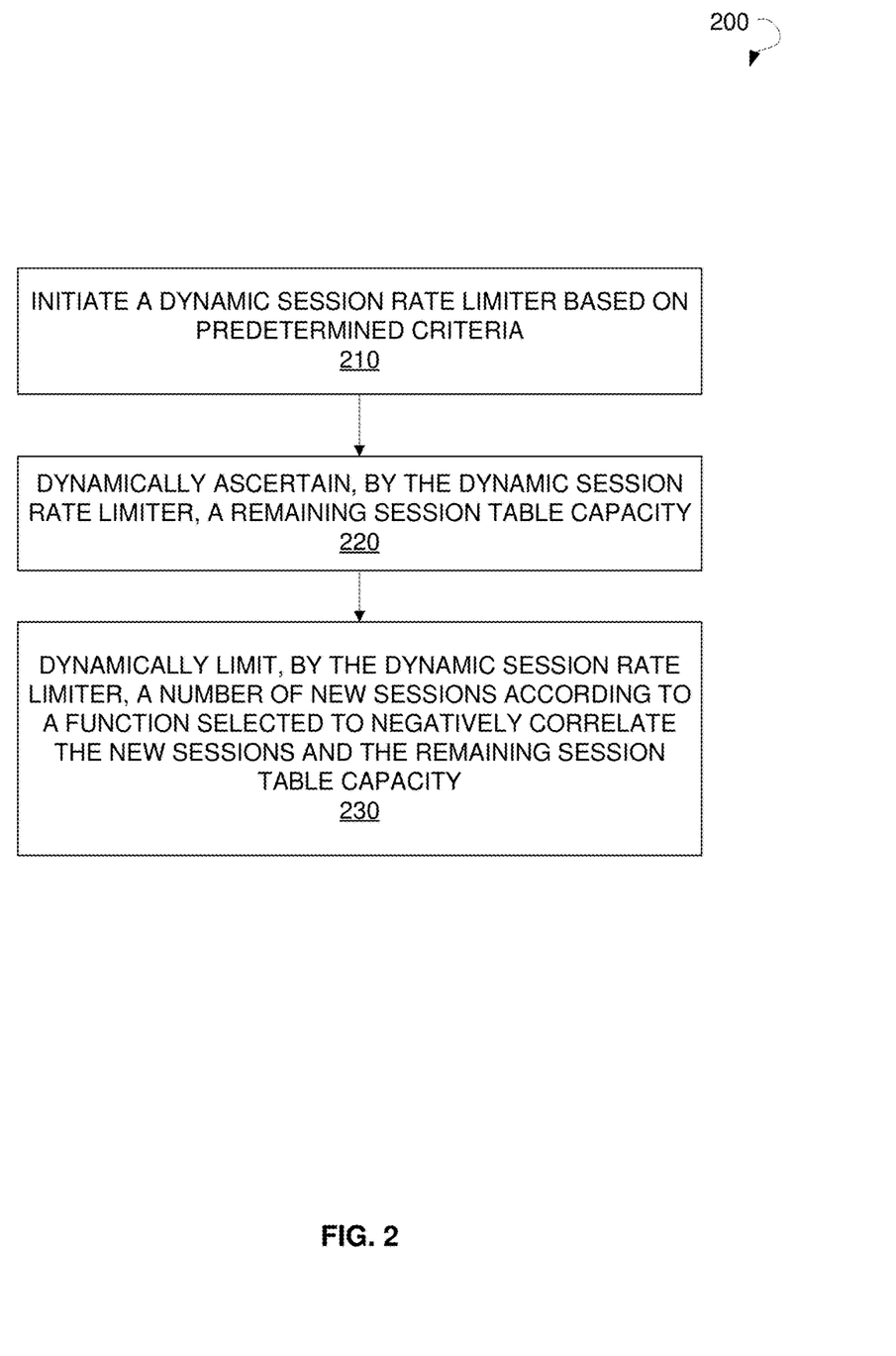
FIG. 2 shows a process flow diagram of a method for dynamically limiting new sessions.

FIG. 2 shows a process flow diagram of a method 200 for dynamically limiting new sessions, according to an example embodiment. In some embodiments, the operations may be combined, performed in parallel, or performed in a different order. The method 200 may also include additional or fewer operations than those illustrated. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence with initiating, by a processor, a dynamic session rate limiter based on predetermined criteria at operation 210. In an example embodiment, the predetermined criteria may include determining that a remaining session table capacity for the new sessions is below a first predetermined threshold. The remaining session table capacity may include a number of new sessions allowed to be established. More specifically, a session table capacity may include a predetermined number of sessions allowed to exist, e.g., between a server and a plurality of users, at the same moment of time. Therefore, the number of current existing sessions stored in a session table may be determined in order to calculate the number of remaining sessions allowed to be established (i.e., to calculate the remaining session table capacity).

The method 200 may further include dynamically ascertaining, by the dynamic session rate limiter, the remaining session table capacity at operation 220. More specifically, the dynamic session rate limiter may ascertain the remaining session table capacity at each moment of time based at least on the number of established sessions.

The method 200 may continue with dynamically limiting, by the dynamic session rate limiter, a number of new sessions at operation 230. More specifically, the number of new sessions may be limited according to a function selected to negatively correlate the new sessions and the remaining session table capacity. In an example embodiment, the function may include an inverse proportionality between the new sessions and a logarithm of the remaining session table capacity. In an example embodiment, any other inverse function may be used to negatively correlate the new sessions and the remaining session table capacity.

The new sessions may be dynamically limited without completing a three-way handshake procedure that usually needs to be performed for establishing TCP connections. More specifically, the limiting of the allowed number of new sessions may be performed before establishing a session with a user that sent a request to establish the session with the server. The user may be a legitimate client requesting to establish the session with a network resource associated with the server. In another example embodiment, the user may be an IoT device that sends requests to the server during an IoT botnet attack. In a further example embodiment, the user may be a compromised electronic device that sends requests to the server during a DoS attack. Therefore, as the limiting of the allowed number of new sessions is performed before establishing the sessions, no time or machine resources are spent for establishing the session with each user that sends the request to establish the session. In other words, only the allowed number of sessions are established and, therefore, the session table does not become overloaded.

The method 200 may further include dynamically determining that the remaining session table capacity for the new sessions is below a second predetermined threshold. Based on such determination, the dynamic session rate limiter may selectively preclude the new sessions until the remaining session table capacity for the new sessions is above the second predetermined threshold. In an example embodiment, the precluding of the new sessions by the dynamic session rate limiter may include limiting the number of the new sessions to zero. In other words, limiting the number of the new sessions to zero may mean locking the session table with the existing sessions in case the number of incoming requests for establishing new sessions is greater than the second predetermined threshold. In an example embodiment, the existing sessions may be analyzed to determine whether the existing sessions are associated with legitimate users. Sessions determined to be initiated by illegitimate users, such as devices engaged in DoS attacks or IoT botnet attacks, may be terminated. Therefore, the session table may be locked with the existing sessions associated only with the legitimate users.

In view of limiting the number of the new sessions to zero, the existing sessions, i.e., the established sessions with legitimate users, may not be aged out. More specifically, conventionally, when the session table capacity decreases, the sessions established earlier may be determined to be aged out and may be terminated. Data associated with the terminated sessions may be erased from the session table to increase the session table capacity for establishing new sessions. However, the terminated sessions may be associated with legitimate clients that may be currently engaged in the network environment associated with the server. In case of termination of the sessions, the legitimate clients may try to reestablish the sessions with the server and, therefore, the number of requests of reestablishing new sessions may increase. Additionally, when there is a need to reestablish the sessions with the server, the clients may have a negative experience because the clients may be disconnected from the network environment and may be unable to perform some types of activity within the network environment. The activity performed by the users within the network environment may include participating in an online game, performing purchases on a website associated with the server, reviewing specific sections of the website associated with the server, and the like.

When limiting the number of the new sessions to zero, the sessions established earlier may be kept active. Therefore, the legitimate clients may remain engaged in the network environment associated with the server. Thus, even in case of the DoS attack or the IoT botnet attack directed to the server, the clients that already have the established sessions may be not affected and their sessions may be maintained active.

In one example embodiment, the new sessions may be created as a result of the IoT botnet attack. In another example embodiment, the new sessions may be created as a result of the DoS attack. The established new sessions may be analyzed to determine whether the session is initiated by a legitimate user (i.e., the client) or by an attacker in the course of the DoS attack or the IoT botnet attack. Based on the analysis, the sessions determined to be initiated by the attacker may be terminated. Data associated with the terminated sessions may be removed from the session table and, therefore, the session table capacity may increase.

In a further example embodiment, the method 200 may include determining that at least one existing session is idle. More specifically, data in the table session may be analyzed to determine where the sessions stored in the session table comply with predetermined rules or standards. For example, a request may be sent to a client associated with the existing session. If no request is received from the client in response to sending of the request, the existing session may be determined to be idle. Any other analysis or testing may be possible for determining whether the session table stores data associated with idle sessions. Based on the determining that the at least one existing session is idle, the at least one existing session may be terminated to increase the remaining session table capacity. When the session table capacity increases again due to deleting the idle sessions from the session table, the dynamic session rate limiter may resume limiting new sessions according to the previously selected function.

Figure 3:
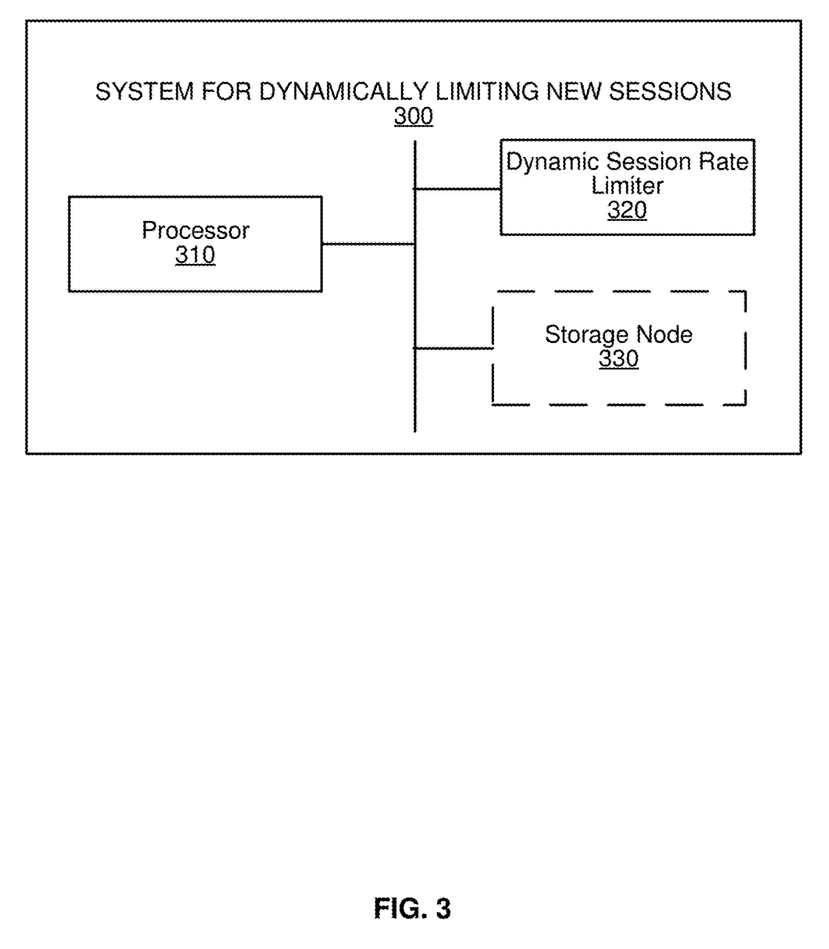
FIG. 3 shows a block diagram illustrating various modules of a system for dynamically limiting new sessions.

FIG. 3 shows a block diagram illustrating various modules of a system 300 for dynamically limiting new sessions, according to an example embodiment. Specifically, the system 300 may include a processor 310, a dynamic session rate limiter 320, and, optionally, a storage node 330.

The processor 310 may be configured to initiate a dynamic session rate limiter 320 based on predetermined criteria. The predetermined criteria include determining that the remaining session table capacity for the new sessions is below a first predetermined threshold.

The dynamic session rate limiter 320 may be configured to dynamically ascertain a remaining session table capacity. The dynamic session rate limiter 320 may be further configured to dynamically limit a number of new sessions according to a function selected to negatively correlate the new sessions and the remaining session table capacity. In an example embodiment, the function may include an inverse proportionality between the new sessions and a logarithm of the remaining session table capacity. In an example embodiment, the new sessions may be limited without completing a three-way handshake procedure.

In a further example embodiment, the new sessions may be created as a result of an IoT botnet attack. In another example embodiment, the new sessions may be created as a result of a DoS attack.

In an example embodiment, the dynamic session rate limiter 320 may be further configured to dynamically determine that the remaining session table capacity for the new sessions is below a second predetermined threshold. Upon determining that the remaining session table capacity for the new sessions is below the second predetermined threshold, the dynamic session rate limiter 320 may selectively preclude the new sessions until the remaining session table capacity for the new sessions is above the second predetermined threshold. The preclusion of the new sessions may include limiting the number of the new sessions to zero.

The dynamic session rate limiter 320 may be further configured to determine that at least one existing session is idle. More specifically, data associated with all existing sessions may be stored in the session table. The dynamic session rate limiter 320 may terminate the idle existing session to increase the remaining session table capacity.

The storage node 330 may be configured to maintain the session table. The storage node 330 may be further configured to store the remaining session table capacity associated with the session table.

Figure 4:
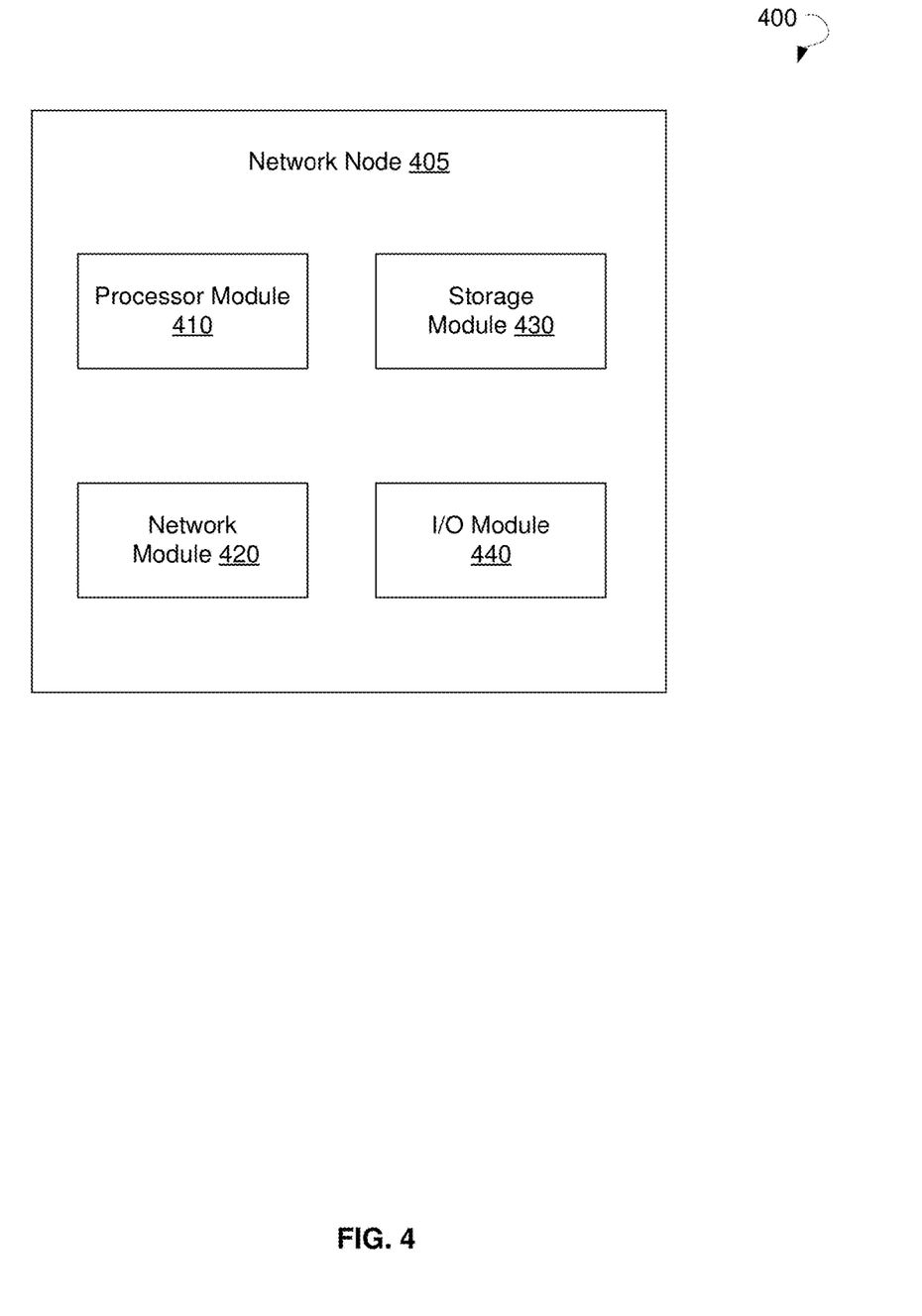
FIG. 4 is a block diagram illustrating a network node.

FIG. 4 is a block diagram 400 illustrating a network node 405, according to an example embodiment. The network node 405 may include a network computer, which can be a client device, a server, and a dynamic session rate limiter, such as client devices 125, a server 130, and a dynamic session rate limiter 320 as shown on FIG. 1. In an example embodiment, the network node 405 may include a processor module 410, a network module 420, and a storage module 430. In an example embodiment, the processor module 410 may include one or more processors which may be a micro-processor, an Intel processor, an AMD processor, a Microprocessor without Interlocked Pipeline Stages processor, a restricted instruction set computer (RISC) processor, or an Advanced RISC Machine (ARM)-based processor. In an example embodiment, the processor module 410 may include one or more processor cores embedded in a processor. In a further example embodiment, the processor module 410 may include one or more embedded processors, or embedded processing elements in a Field Programmable Gate Array, an Application Specific Integrated Circuit, or Digital Signal Processor. In an example embodiment, the network module 420 may include a network interface such as Ethernet, optical network interface, a wireless network interface, T1/T3 interface, a WAN interface or LAN interface. In an example embodiment, the network module 420 may include a network processor. In an example embodiment, the storage module 430 may include random access memory (RAM), dynamic random access memory, static random access memory, Synchronous Dynamic Random Access Memory, or memory utilized by the processor module 410 or the network module 420. In an example embodiment, the storage module 430 may store data utilized by the processor module 410. In an example embodiment, the storage module 430 may include a hard disk drive, a solid state drive, an external disk, a Digital Versatile Disc (DVD), a Compact Disc (CD), or a readable external disk. The storage module 430 may store one or more computer programming instructions which when executed by the processor module 410 or the network module 420 may implement one or more of the functionality of the present disclosure. In an example embodiment, the network node 405 may include an input/output (I/O) module 440, which may include a keyboard, a keypad, a mouse, a gesture based input sensor, a microphone, a physical or sensory input peripheral, a display, a speaker, or a physical or sensual output peripheral.

In an example embodiment, the client devices 125, the server 130, and the dynamic session rate limiter 320 as illustrated on FIG. 1 may be the network node 405 as illustrated in FIG. 4. Returning to FIG. 3, in an example embodiment, the processor 310 and the storage node 330 may be configured to be components of the dynamic session rate limiter 320. More specifically, the processor 310 shown on FIG. 3 may be implemented in a form of the processor module 410 shown on FIG. 4. Additionally, the storage node 330 shown on FIG. 3 may be implemented in a form of the storage module 430 shown on FIG. 4.

Figure 5:
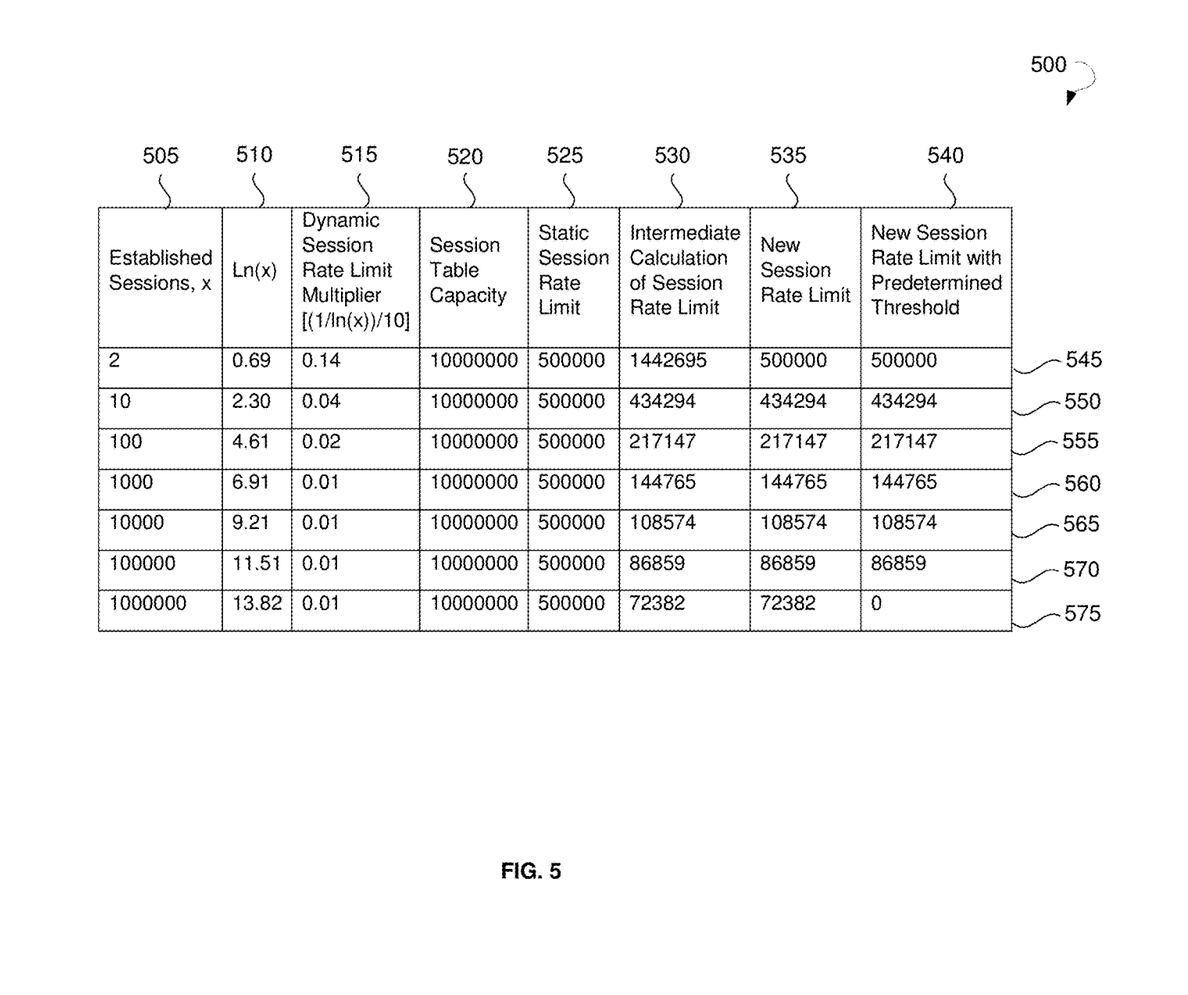
FIG. 5 shows a table illustrating calculation of a limit for a number of new sessions.

FIG. 5 shows a table 500 illustrating calculation of a limit for a number of new sessions, according to an example embodiment. A column 505 shows a number for established sessions as x. A column 510 shows a natural logarithm of values of the column 505 (i.e., the natural logarithm ln(x) of the number for established sessions x). A column 515 shows a dynamic session rate limit multiplier, which may be calculated as 1/ln(x)/10.

A column 520 shows a session table capacity. In an example embodiment, the session table capacity may be constant. For example, the session table capacity be equal to 10 million sessions, as shown in the column 520, or any other number of sessions.

A column 525 shows a static session rate limit. The static session rate limit may be used when no dynamical limiting of new sessions is performed. The static session rate limit may be constant. For example, the session rate limit may be set as 500,000 sessions, as shown in column 525, or any other number of sessions.

A column 530 shows an intermediate calculation of a session rate limit, i.e. the limit for new sessions. The intermediate calculation of the session rate limit may be equal to the session table capacity shown in the column 520 multiplied by the dynamic session rate limit multiplier shown in the column 515. A column 535 shows a new session rate limit, which may a smaller of the numbers selected from the static session rate limit shown in the column 525 and the intermediate calculation of the session rate limit shown in column 530.

A column 540 shows a new session rate limit with a predetermined threshold for the number of established sessions. In an example embodiment, the predetermined threshold for the number of established sessions may be selected as a percentage of the session table capacity, such as 30 percent, 40 percent, 50 percent, 70 percent, and any other percentage. For example, the predetermined threshold may be set equal to 450,000 established sessions. If the number of established sessions, x, shown in the column 505, is lower than the predetermined threshold, the new session rate limit shown in the column 540 is equal to the new session rate limit shown in the column 535. If the number of established sessions, x, shown in the column 505 is higher than the predetermined threshold, the new session rate limit shown in the column 540 is equal to zero.

As can be seen in the table 500, the number of established sessions, x, in lines 545, 550, 555, 560, 565, and 570 of the table 500 is smaller than the predetermined threshold of 450,000 established sessions. Therefore, the new session rate limit shown in the column 540 is equal to the new session rate limit shown in the column 535 in the lines 545, 550, 555, 560, 565, and 570. In a line 575 of the table 500, the number of established sessions, x, is greater than the predetermined threshold of 450,000 established sessions. Therefore, the new session rate limit shown in the column 540 is equal to zero in the line 575.

Figure 6:
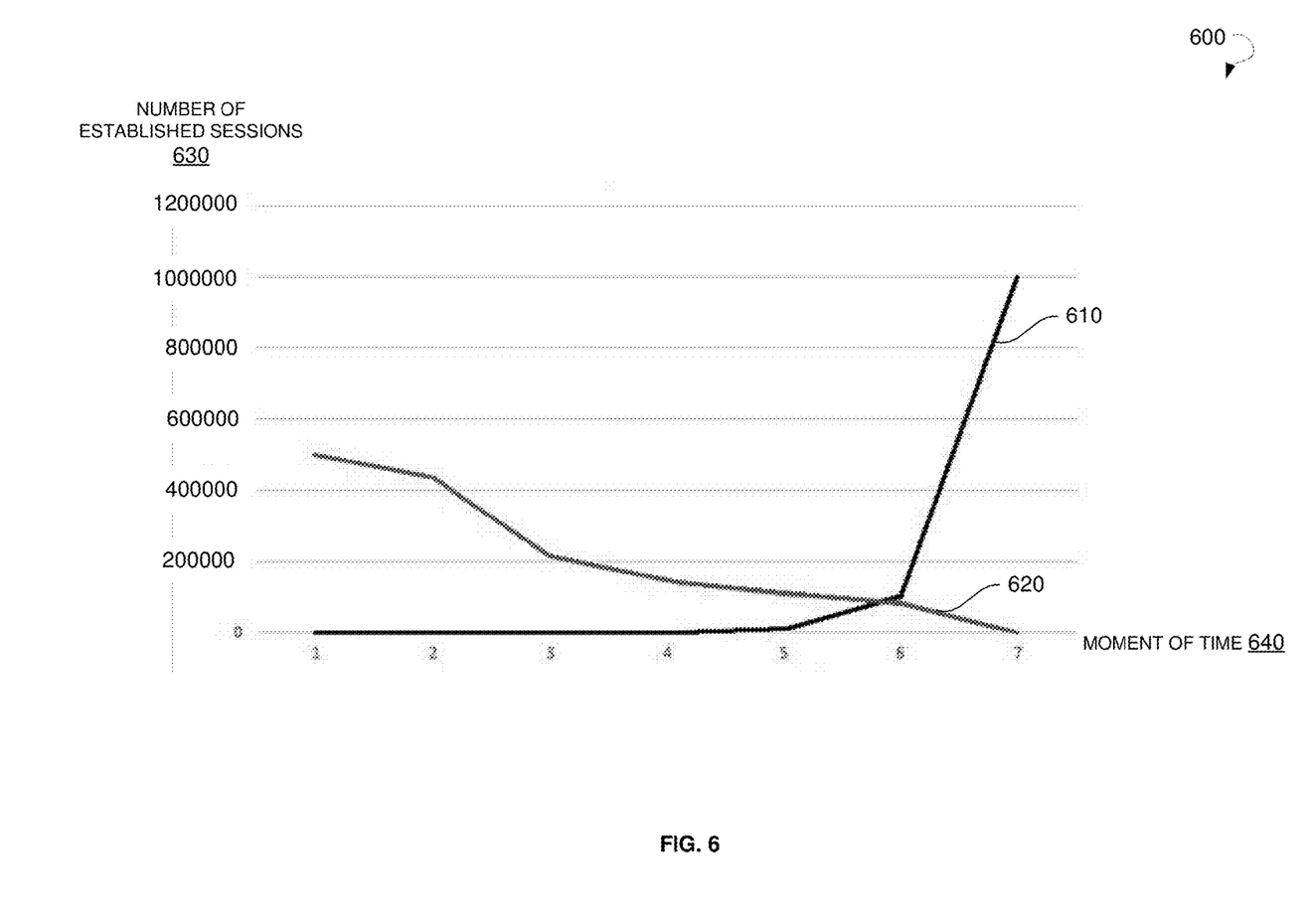
FIG. 6 shows a diagram illustrating a dependency of a new session rate limit from a number of established sessions.

FIG. 6 is a diagram 600 illustrating a dependency of a new session rate limit from the number of established sessions, according to an example embodiment. The diagram 600 shows a curve 610 showing a number of established sessions 630 at a specific moment of time 640. The number of established sessions 630 may correspond to the number of established sessions shown in the column 505 on FIG. 5. The diagram 600 further shows a curve 620 representing a new session rate limit based on the number of established sessions 630 at each moment of time 640. The new session rate limit may correspond to the new session rate limit with the predetermined threshold as shown in the column 540 on FIG. 5.

Figure 7:
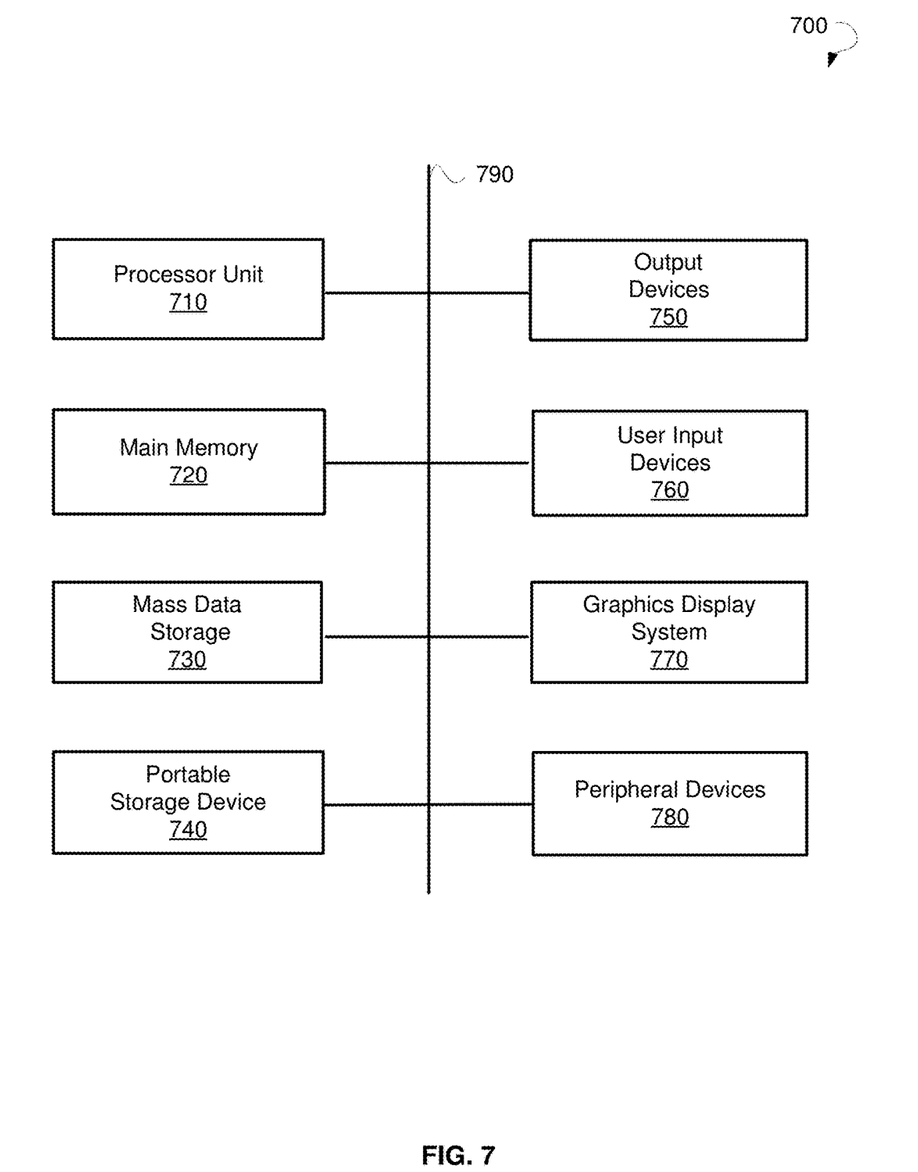
FIG. 7 shows a diagrammatic representation of a computing device for a machine, within which a set of instructions for causing the machine to perform any one or more of the methodologies discussed herein can be executed.

FIG. 7 illustrates a computer system 700 that may be used to implement embodiments of the present disclosure, according to an example embodiment. The computer system 700 may serve as a computing device for a machine, within which a set of instructions for causing the machine to perform any one or more of the methodologies discussed herein can be executed. The computer system 700 can be implemented in the contexts of the likes of computing systems, networks, servers, or combinations thereof. The computer system 700 includes one or more processor units 710 and main memory 720. Main memory 720 stores, in part, instructions and data for execution by processor units 710. Main memory 720 stores the executable code when in operation. The computer system 700 further includes a mass data storage 730, a portable storage device 740, output devices 750, user input devices 760, a graphics display system 770, and peripheral devices 780. The methods may be implemented in software that is cloud-based.

The components shown in FIG. 7 are depicted as being connected via a single bus 790. The components may be connected through one or more data transport means. Processor units 710 and main memory 720 are connected via a local microprocessor bus, and mass data storage 730, peripheral devices 780, the portable storage device 740, and graphics display system 770 are connected via one or more I/O buses.

Mass data storage 730, which can be implemented with a magnetic disk drive, solid state drive, or an optical disk drive, is a non-volatile storage device for storing data and instructions for use by processor units 710. Mass data storage 730 stores the system software for implementing embodiments of the present disclosure for purposes of loading that software into main memory 720.

The portable storage device 740 operates in conjunction with a portable non-volatile storage medium, such as a floppy disk, a CD, a DVD, or USB storage device, to input and output data and code to and from the computer system 700. The system software for implementing embodiments of the present disclosure is stored on such a portable medium and input to the computer system 700 via the portable storage device 740.

User input devices 760 provide a portion of a user interface. User input devices 760 include one or more microphones, an alphanumeric keypad, such as a keyboard, for inputting alphanumeric and other information, or a pointing device, such as a mouse, a trackball, a stylus, or cursor direction keys. User input devices 760 can also include a touchscreen. Additionally, the computer system 700 includes output devices 750. Suitable output devices include speakers, printers, network interfaces, and monitors.

Graphics display system 770 includes a liquid crystal display or other suitable display device. Graphics display system 770 receives textual and graphical information and processes the information for output to the display device. Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for dynamically limiting new sessions have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for dynamically limiting new sessions, the system comprising:
    a processor configured to initiate a dynamic session rate limiter based on predetermined criteria;
    the dynamic session rate limiter configured to:
        dynamically ascertain a remaining session table capacity; and
        dynamically limit acceptance of session requests for new sessions according to a function selected to negatively correlate a number of the new sessions and a number of sessions allowed to be established at a current time in accordance with the remaining session table capacity; and
    a storage node configured to:
        maintain a session table; and
        store the remaining session table capacity associated with the session table.

2. The system of claim 1, wherein the function includes an inverse proportionality between the new sessions and a logarithm of the remaining session table capacity.

3. The system of claim 1, wherein the predetermined criteria include determining that the remaining session table capacity for the new sessions is below a first predetermined threshold.

4. The system of claim 1, wherein the new sessions are limited without completing a three-way handshake.

5. The system of claim 1, wherein the new sessions are created as a result of an Internet of Things (IoT) botnet attack.

6. The system of claim 1, wherein the new sessions are created as a result of a Denial of Service (DoS) attack.

7. The system of claim 1, wherein the dynamic session rate limiter is further configured to:
    dynamically determine that the remaining session table capacity for the new sessions is below a second predetermined threshold; and
    based on the determination, selectively preclude the new sessions until the remaining session table capacity for the new sessions is above the second predetermined threshold.

8. The system of claim 7, wherein the precluding the new sessions includes limiting the number of the new sessions to zero.

9. The system of claim 1, wherein the dynamic session rate limiter is further configured to:
    determine that at least one existing session is idle; and
    based on the determination, terminate the at least one existing session to increase the remaining session table capacity.

10. The system of claim 9, wherein the session table stores data associated with the at least one existing session.

11. A method for dynamically limiting new sessions, the method comprising:
    initiating, by a processor, a dynamic session rate limiter based on predetermined criteria;
    dynamically ascertaining, by the dynamic session rate limiter, a remaining session table capacity associated with a session table, the session table being maintained by a storage node, the remaining session table capacity associated with the session table being stored in the storage node; and
    dynamically limiting, by the dynamic session rate limiter, acceptance of session requests for new sessions according to a function selected to negatively correlate a number of the new sessions and a number of sessions allowed to be established at a current time in accordance with the remaining session table capacity.

12. The method of claim 11, wherein the function includes an inverse proportionality between the new sessions and a logarithm of the remaining session table capacity.

13. The method of claim 11, wherein the predetermined criteria include determining that the remaining session table capacity for the new sessions is below a first predetermined threshold.

14. The method of claim 11, wherein the new sessions are limited without completing a three-way handshake.

15. The method of claim 11, wherein the new sessions are created as a result of an Internet of Things (IoT) botnet attack.

16. The method of claim 11, wherein the new sessions are created as a result of a Denial of Service (DoS) attack.

17. The method of claim 11, further comprising:
    dynamically determining that the remaining session table capacity for the new sessions is below a second predetermined threshold; and
    based on the determination, selectively precluding, by the dynamic session rate limiter, the new sessions until the remaining session table capacity for the new sessions is above the second predetermined threshold.

18. The method of claim 17, wherein the precluding, by the dynamic session rate limiter, of the new sessions includes limiting the number of the new sessions to zero.

19. The method of claim 11, further comprising:
    determining that at least one existing session is idle; and
    based on the determination, terminating the at least one existing session to increase the remaining session table capacity.

20. A system for dynamically limiting new sessions, the system comprising:

a processor configured to initiate a dynamic session rate limiter based on predetermined criteria;
the dynamic session rate limiter configured to:
  dynamically ascertain a remaining session table capacity; and
  dynamically limit acceptance of session requests for new sessions according to a function selected to negatively correlate a number of the new sessions and a number of sessions allowed to be established at a current time in accordance with the remaining session table capacity;
  dynamically determine that the remaining session table capacity for the new sessions is below a second predetermined threshold;
  based on the determination, preclude the new sessions until the remaining session table capacity for the new sessions is above the second predetermined threshold;
  determine that at least one existing session is idle; and
  based on the determination, terminate the at least one existing session to increase the remaining session table capacity; and
a storage node configured to:
  maintain a session table; and
  store the remaining session table capacity associated with the session table.

* * * * *